(12) United States Patent
Shinde (10) Patent No.: US 11,967,307 B2
(45) Date of Patent: Apr. 23, 2024

(54) VOICE COMMUNICATION ANALYSIS SYSTEM

(71) Applicant: Oracle International Corporation, Redwood Shores, CA (US)

(72) Inventor: Suraj Shinde, Metepec (MX)

(73) Assignee: Oracle International Corporation, Redwood Shores, CA (US)

( * ) Notice: Subject to any disclaimer, the term of this patent is extended or adjusted under 35 U.S.C. 154(b) by 419 days.

(21) Appl. No.: 17/174,845

(22) Filed: Feb. 12, 2021

(65) Prior Publication Data

US 2022/0262348 A1    Aug. 18, 2022

(51) Int. Cl.
| | |
|---|---|
| *G10L 15/16* | (2006.01) |
| *G06N 3/045* | (2023.01) |
| *G06N 20/00* | (2019.01) |
| *G10L 15/06* | (2013.01) |
| *G10L 15/22* | (2006.01) |

(52) U.S. Cl.
CPC .............. *G10L 15/16* (2013.01); *G06N 3/045* (2023.01); *G06N 20/00* (2019.01); *G10L 15/063* (2013.01); *G10L 15/22* (2013.01); *G10L 2015/223* (2013.01)

(58) Field of Classification Search
CPC ....... G10L 15/16; G10L 15/063; G10L 15/22; G10L 2015/223; G10L 17/02; G10L 17/18; G10L 17/26; G06N 3/045; G06N 20/00; G06N 3/044; G06N 3/08

See application file for complete search history.

(56) References Cited

U.S. PATENT DOCUMENTS

| | | | |
|---|---|---|---|
| 2010/0228656 A1* | 9/2010 | Wasserblat | G06Q 40/03 |
| | | | 705/35 |
| 2019/0347425 A1* | 11/2019 | Yu | G06F 21/577 |
| 2020/0218916 A1* | 7/2020 | Wu | G06V 40/40 |
| 2020/0366671 A1* | 11/2020 | Larson | H04W 12/06 |
| 2021/0073819 A1* | 3/2021 | Hernandez | G06Q 20/4016 |
| 2021/0174144 A1* | 6/2021 | Chen | G06N 20/00 |
| 2021/0174805 A1* | 6/2021 | Wang | G10L 25/63 |
| 2023/0058169 A1* | 2/2023 | Cella | G06F 11/3457 |

* cited by examiner

*Primary Examiner* — Michael Colucci
(74) *Attorney, Agent, or Firm* — Invoke (57) ABSTRACT

Techniques are disclosed for applying a trained machine learning model to incoming voice communications to determine whether the voice communications are genuine or not genuine. The trained machine learning model may identify vocal attributes within the target call and use the identified attributes, and the training, determine whether the target call is genuine or not genuine. An applied trained machine learning model may include multiple different types of trained machine learning models, where each of different types of machine learning models is trained and/or configured for a different function within the analysis.

18 Claims, 5 Drawing Sheets

FIG. 5

VOICE COMMUNICATION ANALYSIS SYSTEM

TECHNICAL FIELD

The present disclosure relates to methods and systems for determining whether an incoming call is genuine. In particular, the present disclosure relates to a voice communication analysis system.

BACKGROUND

Automated technologies may route incoming voice calls to a proper recipient in a call center or office environment. These interactive voice response (IVR) systems may receive spoken menu selections, typed menu selections, or even natural language descriptions. An IVR system may then analyze the input from the incoming call and forward the incoming call to a department, phone bank, or individual that is assigned to respond to the issues presented in the IVR input.

Despite the efficiency improvement that comes from IVR systems, challenges to the efficient processing of incoming voice calls remain. For example, a measurable portions of incoming calls are not genuine. Detecting and filtering out incoming calls that are not genuine would improve call center productivity and/or reduce workload at public service agencies (e.g., emergency responder departments).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DETERMINING WHETHER AN INCOMING CALL IS GENUINE OR NOT GENUINE
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments train a machine learning model to determine whether a received voice call is genuine or not genuine. The system trains a machine learning model using a training data set of historical calls. The training data set of historical calls may identify the vocal attributes of the historical calls. The historical calls in the training data set may also be labeled to indicate whether each call is genuine or not genuine. Once trained, the machine learning model may be applied to a received "target" call. The trained machine learning model may identify vocal attributes within the target call and, based on the training, determine whether the target call is genuine or not genuine.

In some examples, applying the trained machine learning model may actually include applying two different types of trained machine learning models. A first trained machine learning model may determine one or more attributes in the target call, such as a set of frequencies and/or frequency ranges. A second trained machine learning model may determine rates of change within the one more attributes detected by the first trained machine learning model. The system may use the combined analysis of these two trained machine learning models to determine whether the target call is genuine or not genuine.

One or more embodiments described in this Specification and/or recited in the claims may not be included in this General Overview section.

2. Architectural Overview

Figure 1:
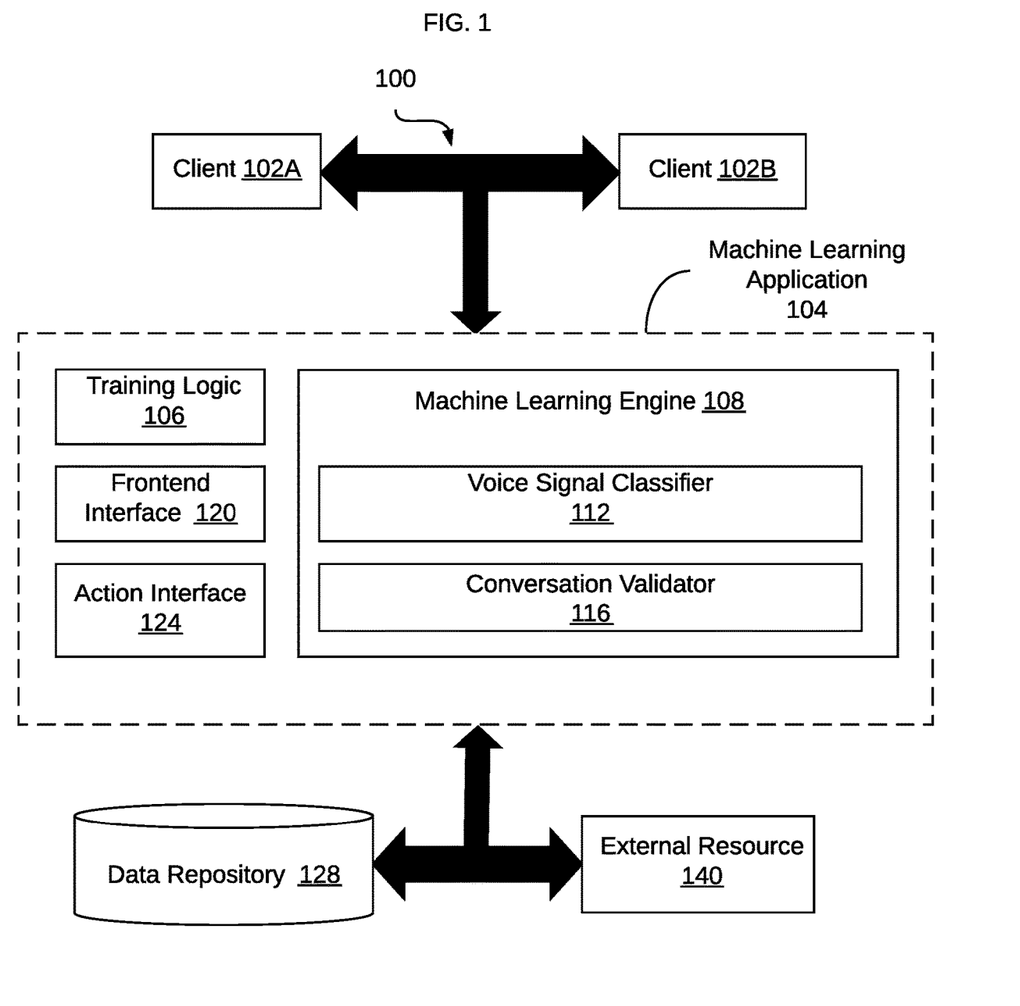
FIG. 1 illustrates a system in accordance with one or more embodiments.

FIG. 1 illustrates a system 100 in accordance with one or more embodiments. As illustrated in FIG. 1, system 100 includes elements that may detect whether an incoming voice call is genuine or not genuine. Based on this determination, elements of the system 100 may filter out the calls that are not genuine (e.g., by disconnecting the call, forwarding the call to a voice message system) or direct genuine calls to a recipient. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 100 includes clients 102A, 102B, a machine learning (ML) application 104, a data repository 128, and an external resource 140.

Examples of the client 102A may include a device used to place an incoming call that is analyzed by the machine learning application 104. For example, the client 102A may include devices that place a call via the public switched telephone system ("PSTN") such as via a "land line," a mobile telephone, or a mobile computing device configured with an internet-based audio communication protocols (e.g., voice over internet or "VOIP").

In some examples, the client 102B may be a user device that presents an interface by which a user may apply labels to conversations in a training data set or apply labels to a target conversation contemporaneous with the target conversation itself. As described below, labeled conversations are used to train the machine learning application to determine whether an incoming call is genuine or not genuine. In these examples, the client 102B may be a web browser, a mobile application, or other software application communicatively coupled to a network (e.g., via a computing device). A client may interact with cloud services using one or more communication protocols, such as HTTP and/or other communication protocols of the Internet Protocol (IP) suite. In other embodiments, ML application 104 may be locally accessible to a user, such as a desktop or other standalone application.

In some examples, the client 102B may be a user device configured to receive a voice call from the client 102A. Much like the client 102A, the client 102B may be a computing device, a mobile computing device, or other system that may engage in one or more communication protocols and/or communications applications. These communication protocols and/or communications applications include, but are not limited to, a session initiation protocol (SIP) communication application, internet-based audio communication protocols (e.g., voice over internet or "VOIP"), and the like. In some examples, a SIP communication application and/or VOIP communication application may engage with an incoming call regardless of the audio technology used to generate the incoming call.

The machine learning application 104 analyzes a voice signal within a received "target" voice communication (also referred to as a "call") to determine whether the voice communication is genuine or not genuine. That is, the machine learning application 104 identifies one or more vocal attributes within the voice signal of the target call to determine whether the stated intent of the voice communication is true. In this way, the machine learning application 104 may determine whether a request for help, a request for information, or an expressed interest in purchasing a product or service correspond to a real need or whether the call is made for some other purpose (e.g., as a prank call, a malicious distraction). The machine learning application 104 may route the voice communication based on the determination of whether the voice communication is genuine or not. Genuine voice communications may be routed to an appropriate recipient and/or destination. Voice communications that are not genuine may be terminated or routed for remedial action (e.g., to a voice message system, a warning recording, a disciplinary or remedial entity).

The machine learning application 104 itself includes a training logic 106, a machine learning engine 108, a frontend interface 120, and an action interface 124.

In some examples, the training logic 106 receives a set of electronic files as input (i.e., a training corpus). Examples of electronic documents include, but are not limited to, electronically stored recorded voice communications. A voice communication file supplied to the training logic 106 may include a label (or labels) that identify whether the voice communication was genuine (i.e., corresponding to an actual need) or not genuine (e.g., not corresponding to an actual need, such as a prank call or a malicious call). In some examples, described below, a voice communication file may include an additional label for calls that are not genuine that represent an intent of the non-genuine call. The system may use these labeled training materials in preparation for applying a trained machine learning model to a new, "target" voice communication to determine whether the target voice communication is genuine or not genuine.

The voice communication files supplied to the training logic 106 may also be processed and/or analyzed by other components of the machine learning application 104 to identify one more vocal attributes of a voice signal (i.e., a digital representation of the works spoken by a caller) within a voice communication. For example (and as described below), various aspects of the system 100 (e.g., the machine learning engine 108) may determine frequencies, frequency ranges, and rates of change in amplitudes of the various frequencies and/or frequency ranges. In some examples, the system 100 (e.g., the machine learning engine 108) may identify relative "strengths" of one or more of the frequencies and/or frequency ranges within a voice signal. That is, amplitudes of various frequencies and/or frequency ranges and compared to one another via a ratio, a normalization factor, or another similar technique that facilitates direct comparison of the relative strength of different frequencies in the voice signal. In other words, the relative strength of the various frequencies and/or frequency ranges identifies a proportion of the total volume of the voice signal corresponding to the various frequencies. The various attributes and the labels may be used by the training logic 106 to associate various combinations of attributes with genuine voice communications and voice communications that are not genuine.

The training logic 106 may be in communication with a user system, such as client 102B. The client 102B may include an interface used by a user to apply labels to the electronically stored voice communications. In some examples, labels may be applied via the client 102B contemporaneously with a target conversation, which may also be used to by the training logic 106 to train the ML engine 108.

In some embodiments, the training logic 106 is configured to identify feature values and generate feature vectors from the voice communications described above, collectively referred to as a training corpus. The training logic 106 may tokenize vocal attributes (e.g., frequencies, amplitudes, relative strengths, rates of change in frequencies and/or amplitudes) into tokens. The training logic 106 may then generate feature vectors that include a sequence of values, with each value representing a different attribute token.

The training logic 106 may append other features to the generated feature vectors. In one example, a feature vector may be represented as $[f_1, f_2, f_3, f_4]$, where $f_1$, $f_2$, $f_3$ correspond to attribute tokens and where $f_4$ is a non-attribute feature. Example non-attribute features may include, but are not limited to, a total duration of a communication session, an elapsed time of communication session, a type of call, a label indicating whether the feature vector is associated with a genuine voice communication or a voice communication that is not genuine, an intent associated with a non-genuine call, among others. The training logic 106 may optionally be applied to target conversations to facilitate their analysis and/or incorporate a target conversation into a training corpus.

The machine learning (ML) engine 108 is configured to automatically learn, from the training logic 106, which vocal attributes are associated with voice communications that are genuine and which vocal attributes are associated with voice communications that are not genuine. Example techniques for identifying whether a voice communication is genuine or not genuine are described in the context of FIGS. 2 and 3.

The machine learning engine 108 includes a voice signal classifier 112 and a conversation validator 116.

Figure 2:
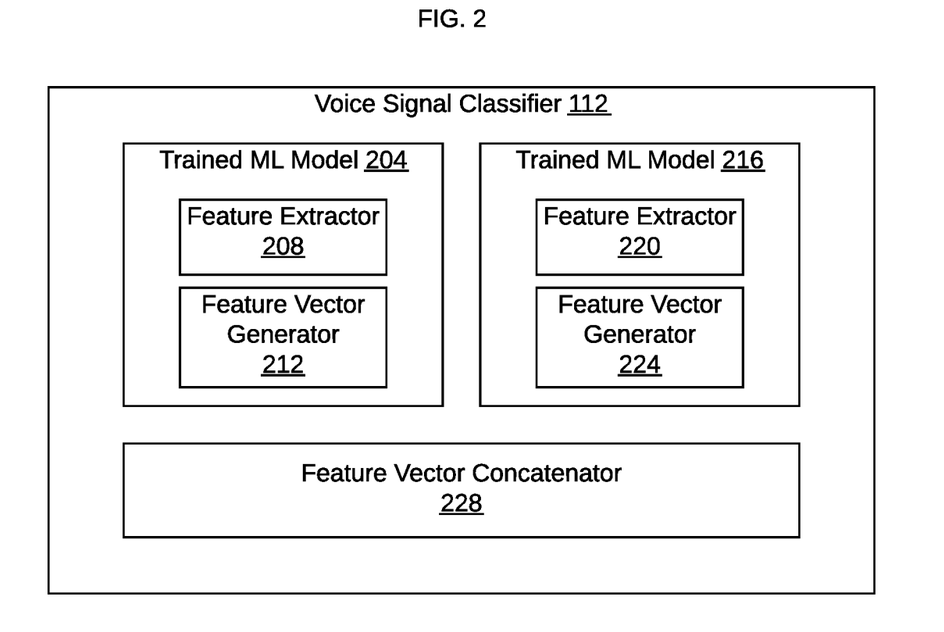
FIG. 2 illustrates an example voice signal classifier system for determining whether an incoming voice call is genuine or not genuine in accordance with one or more embodiments.

The voice signal classifier 112, described in more detail in the context of FIG. 2, analyzes voice communication signals. The analyzing includes identifying voice attributes therein. The voice signal classifier 112 may, as described above in the context of the training logic 106, generate feature vectors that concisely represent the identified voice attributes. The voice signal classifier 112 may then analyze and process the feature vectors of voice attributes as described below in the context of FIG. 2.

Turning to FIG. 2, an example of the voice signal classifier 112 is shown. The illustrated embodiment of the voice signal classifier 112 includes a first trained machine learning (ML) model 204 and a second trained machine learning (ML) model 216, both of which have corresponding feature extractors 208, 220 and feature vector generators 212, 224, respectively.

The embodiment of the voice signal classifier 112 uses the two different trained ML models 204, 216 to improve accuracy of the analysis described below. It will be appreciated that other embodiments may use only a single trained ML model (e.g., one of trained ML model 204, 216) or even a third, a fourth, or more trained ML models to optimize analytical speed, accuracy, and efficiency.

The voice signal classifier 112 may include features that pre-process the voice signal to improve clarity of the voice signal and accuracy of the analysis executed by the trained ML models 204, 216. For example, the voice signal classifier 112 may pre-process the received signal by filtering out components of the signal that are not to be analyzed by the trained ML models 204, 216. In some examples, the voice signal classifier 112 may identify and remove background noise from the received voice signal. For example, background noise may be removed from the received voice signal by suppressing audio signals that are below a threshold amplitude (e.g., a voice in the background of the call) or by filtering out recognizable background sounds such as lawn mowers, traffic, barking dogs, closing doors, ventilation systems that may otherwise obscure the components of the voice signal to be analyzed.

In other examples, the voice signal classifier 112 may identify and remove IVR system vocalizations or the contributions of a human agent to the voice signal. In some examples, a stored voice profile (e.g., with characteristic frequencies, frequency modulations, and amplitude modulations) corresponding to a human agent or IVR system may be used to identify and remove the IVR or human agent voice signal from a received voice signal. In this way, the received voice communication signal primarily includes the voice signal attributable to the caller. In other examples, the voice signal classifier 112 may separate the voice streams (e.g., in an SIP application) of the caller and the receiving agent and limit the analysis to the voice stream of the caller. Regardless of the technique employed, by filtering out these components of the signal, the voice signal classifier 112 improves the clarity of the voice signal to be analyzed.

The voice signal classifier 112 may further pre-process the received voice communication signal by applying a Fourier transform (e.g., a fast Fourier transform (FFT) or a short-time Fourier transform (STFT)) to the received voice communication signal. This operation generates a frequency domain form of the received voice signal. Processing a received voice communication signal with a FFT also improves the convenience with which background noise may be removed from the signal. The FFT form of the received voice communication signal may then be analyzed by the trained ML model(s) of the voice signal classifier 112.

In the example voice signal classifier 112 illustrated in FIG. 2, the trained ML model 204 is configured and trained to identify a first type of attributes within a received voice signal using a feature extractor 208. The first type of attribute identified by the feature extractor 208 of the trained ML model 204 is that of discrete attributes that include, but are not limited to, frequencies within the received voice signal, a number of different frequencies in the received voice signal, and corresponding amplitudes of the various frequencies.

In some examples, the feature extractor 208 of the trained ML model 204 may be a deep neural network, such as a convolutional neural network. Other types of deep neural networks may also be used that are configured to identified discrete attributes. Regardless of the specific type of neural network, the feature extractor 208 of the trained ML model 204 is configured to identify discrete attributes within the unstructured data of the received voice communication signal.

Once the feature extractor 208 identifies the discrete attributes and their corresponding values, a feature vector generator 212 of the trained ML model 204 may generate a first feature vector that represents the values of corresponding discrete attributes.

The feature extractor 220 of the trained ML model 216 is configured and trained to identify a second type of attribute within the received voice signal, namely patterns within the attributes of the first type. These patterns include, but are not limited to modulations, changes, and rates of change exhibited by the attributes of the first type. For example, the feature extractor 220 of the trained ML model 216 may identify changes in amplitudes of the frequencies identified within the voice signal by the trained ML model 204.

In some examples, the feature extractor 220 of the trained ML model 216 may generate one or more Mel Frequencies Cepstral Coefficients (MFCC or Mel Coefficients) using the Fourier transform of the voice communication signal generated during the pre-processing executed by the voice signal classifier 112. Mel frequency cepstral coefficients may be used to represent a distribution of power of different discrete frequencies (or frequency ranges) in a signal over time. In some examples, MFCCs include a set of from 5 to 30 values that describe a shape of a sound intensity (i.e., amplitude) spectrum. In some examples, a sound intensity spectrum may be partitioned into separate portions (or "windows") of time with one or more MFCCs corresponding to the amplitude within each portion.

Upon generating the MFCCs that describe power fluctuations of the discrete frequencies over time (equivalently referred to as amplitude modulations), the feature vector generator 224 may represent the amplitude modulations of the various frequencies as a second feature vector that describe these power fluctuations.

In some examples, the trained ML model 216 and its feature extractor 220 may be a neural network configured and trained to identify variations in attributes over time and/or rates of change in attribute values. In one example the trained ML model 216 and its feature extractor 220 may be embodied as a recurrent neural network. Other types of neural networks may also be used that are configured for executing predictions within defined response times and/or in real time.

The feature vector concatenator 228 then concatenates the first feature vector representing discrete attributes (e.g., a number of different frequencies, the frequencies themselves, frequency ranges) of the voice communication signal with the second feature vector representing variations in attribute values over time (e.g., amplitude modulations of the identified frequencies).

Returning to FIG. 1, upon identifying the attributes in a voice communication signal, the voice signal classifier 112 passes the generated feature vectors to the conversation validator 116. The conversation validator 116 determines whether the voice communication corresponding to the analyzed voice signal is genuine or not genuine based on the training. In some examples, the conversation validator 116 may itself include a trained ML model that uses the labeled training corpus to distinguish between genuine and not genuine voice communications based on feature vector representations of attributes.

The conversation validator 116 may then act in response to the determination. For example, if the conversation validator 116 determines that the call corresponding to the analyzed voice signal is not genuine, the conversation validator 116 may, indirectly, terminate the call. For example, the conversation validator 116 may transmit an instruction to a communication system (e.g., a SIP system managed by one of a frontend interface 120 or an action interface 124) to terminate the call. In another example, if the conversation validator 116 determines that the call corresponding to the analyzed voice signal is genuine, the conversation validator 116 may transmit an instruction to the action interface 124 to transfer the call to a particular recipient. In some examples, the conversation validator 116 may also access CRM application materials related to the call and provide these CRM materials to a call recipient.

The frontend interface 120 manages interactions between the clients 102A, 102B and the ML application 104. For example, the client 102A may place an incoming call that is received by the frontend interface 120. In another example, the client 102B may submit requests to perform various functions (e.g., label training data) and view results through frontend interface 120. In some examples, the frontend interface 120 may be an interface used by an agent operating the client 102B to communicate with another party, such as a caller using the client 102A.

In some embodiments, frontend interface 120 is a presentation tier in a multitier application. Frontend interface 120 may process requests received from clients and translate results from other application tiers into a format that may be understood or processed by the clients. Frontend interface 120 may be configured to render user interface elements and receive input via user interface elements. For example, frontend interface 120 may generate webpages and/or other graphical user interface (GUI) objects. Client applications, such as web browsers, may access and render interactive displays in accordance with protocols of the internet protocol (IP) suite. Additionally or alternatively, frontend interface 120 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In one or more embodiments, frontend interface 120 refers to hardware and/or software configured to facilitate communications between a user and the client 102B and/or the machine learning application 104. The frontend interface 120 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the frontend interface 120 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 120 is specified in one or more other languages, such as Java, C, or C++.

Action interface 124 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 128 for use as a training document for the machine learning engine 108. As another example, an API in the action interface 124 may access communication systems used by agents and callers so as to execute real-time analysis of the audio stream and/or event stream. It will be appreciated considering these examples that the actions that are performed may vary from implementation to implementation.

In some embodiments, the machine learning application 104 may access external resources, such as cloud services. Example cloud services may include, but are not limited to, social media platforms, email services, short messaging services, enterprise management systems, verbal communication systems (e.g., internet based voice communications, text chat communications, PTSN communications systems) and other cloud applications. Action interface 124 may serve as an API endpoint for invoking a cloud service. For example, action interface 124 may generate outbound requests that conform to protocols ingestible by external resources. Additional embodiments and/or examples relating to computer networks are described below in Section 5, titled "Computer Networks and Cloud Networks."

Action interface 124 may process and translate inbound requests to allow for further processing by other components of the machine learning application 104. The action interface 124 may store, negotiate, and/or otherwise manage authentication information for accessing external resources. Example authentication information may include, but is not limited to, digital certificates, cryptographic keys, usernames, and passwords. Action interface 124 may include authentication information in the requests to invoke functions provided through external resources.

In some examples, the action interface 124 may execute interactive voice response (IVR) systems either before or after the initial receipt of an incoming call. For example, upon receiving a call from the client 102A, an IVR system executed by the action interface 124 may request information from the caller regarding the purpose of the call. In some examples, the IVR system operated by the action interface 124 may request that the caller select an item from a menu corresponding to the purpose of the call. In these examples, the IVR system may route the call to a proper recipient (e.g., a phone number or communication address corresponding to an individual, an office, a group, or a phone bank). In some examples, after this routing, the action interface 124 may request a spoken response to one or more questions that are particular to the proper recipient (e.g., requesting a problem statement from the caller after the caller selects a product support function from the IVR system). In this way, the machine learning engine 108 may determine whether the call is genuine or not.

In other examples, the IVR system operated by the action interface 124 may request a spoken response even before the call is routed, thereby obtaining a voice signal from the caller that may be analyzed by the machine learning engine. For example, the IVR system may inquire as to the subject of the call (e.g., "How may we help you today?" or "What product or service are you calling about?"). In another example, the IVR system may even ask one or more arbitrary questions that are designed to elicit a voice signal that is sufficient to determine whether or not the call is genuine. For example, the IVR system may request the caller state a name, residence location, and state a concise review of a product, or read a passage of text presented to the user (e.g., via text, email, or website).

Upon the machine learning engine 108 determining that an incoming call is genuine, the system may route a call to a proper recipient as described above. In some examples, the action interface 124 may also access other systems that facilitate resolution of the incoming, genuine call. For example, the action interface 124 may engage a customer relationship management system to provide information relevant to the caller that will help the recipient of call respond to the caller. In some examples, the action interface 124 may access customer data stored in the data repository 128 via the customer relationship management system represented in FIG. 1 as the external resource 140.

Upon the machine learning engine 108 determining that an incoming call is not genuine, the action interface 124 may terminate the incoming call. In some examples, the action interface 124 may even route a call that is not genuine to an appropriate remedial destination. For example, a prank call made to a police station may be routed to a system that traces the source of the incoming call so that the caller may be identified and disciplined. Other similar remedial actions may be accomplished via a re-direction of the non-genuine call by the action interface 124.

In one or more embodiments, a data repository 128 is any type of storage unit and/or device (e.g., a file system, database, collection of tables, or any other storage mechanism) for storing data. Further, a data repository 128 may include multiple different storage units and/or devices. The multiple different storage units and/or devices may or may not be of the same type or located at the same physical site. Further, a data repository 128 may be implemented or may execute on the same computing system as the machine learning application 104. Alternatively or additionally, a data repository 128 may be implemented or executed on a computing system separate from the machine learning application 104. A data repository 104 may be communicatively coupled to the machine learning application 104 via a direct connection or via a network.

In one or more embodiments, the machine learning application 104 refers to hardware and/or software configured to perform operations described herein for determining whether an incoming call is genuine or not genuine. Examples of operations for determining whether an incoming call is genuine or not genuine are described below with reference to FIG. 3.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Determining Whether an Incoming Call is Genuine or not Genuine

Figure 3:
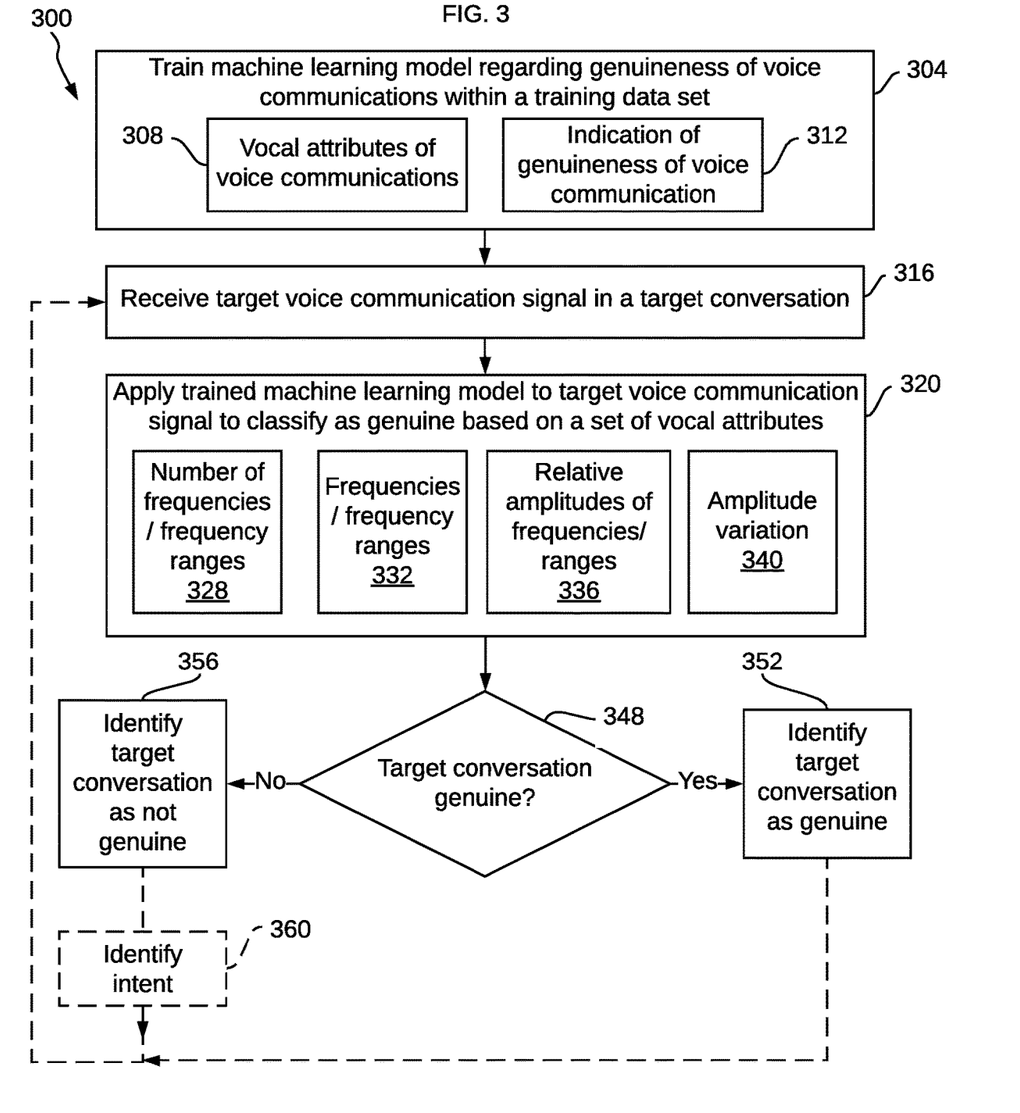
FIG. 3 illustrates an example set of operations for using voice signals to determine whether a voice communication is genuine or not genuine in accordance with one or more embodiments.

FIG. 3 illustrates an example set of operations, referred to collectively as a method 300, for determining whether a voice communication is genuine or not genuine in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The method 300 begins with training one or more machine learning models to analyze voice communications in a training set of voice communications (operation 304). The training may include identifying various voice signal attributes within the voice communications (operation 308). Examples of these attributes, also described above, include but are not limited to, various frequencies within a voice signal, a number of frequencies within a voice signal, and the amplitude (or power) modulation exhibited by one or more of the identified frequencies.

Training may also include labeling one or more of the voice communication in a training data set to indicate whether the voice communication is genuine or is not genuine (operation 312). Examples of genuine voice communications are those that correspond to an actual request or actual need. For example, a genuine call may correspond to an actual question of a user regarding a product, a call to an emergency service to respond to a factually indicated or factually perceived emergency, and the like.

Examples of voice communications that are not genuine include those that do not correspond to an actual request or actual need, but are instead misleading, mischievous, or malicious. For example, a call that is not genuine may correspond to a prank call to an emergency service for an event that does not exist in fact. These can include prank bomb threats, malicious calls to police reporting a false dangerous situation (colloquially referred to as "swatting"), and the like. In more benign examples, a call that is not genuine may correspond to a call inquiring about the purchase of a product where the caller has no actual intention of purchasing the product.

Some examples of a training data set are calls made to emergency services, which are often recorded. Recorded emergency service calls, and corresponding reports and/or summaries produced by the recipient emergency response agency have many features that are helpful for machine learning model training. For example, many emergency service calls are recorded as a matter of course, thereby providing a readily accessible training data set. Reports associated with a particular call that are generated by the recipient emergency response agency may also indicate whether the call was genuine (e.g., corresponding to a bona fide emergency or request of assistance) or not genuine (e.g., a prank call or otherwise not corresponding to a bone fide request for assistance).

Recorded emergency service calls may also be a convenient training data set for training machine learning models because the accents, intonations, dialects, and other voice and/or speech patterns particular to an area are likely to be represented. This is because requests to emergency services may be made by a large cross-section of community members. The random nature of emergency requests (whether to police for help in an automobile collision or to a fire department to respond to a fire) thus may provide a statistically representative sample of community members. This in turn enables the machine learning models to be trained to recognize a call as genuine or not genuine without false positives or false negatives generated by variations in pronunciation, dialect, regional intonations, and the like.

Other training data sets may be used. For example, recorded calls made to a help center, a call center (e.g., for sales or client service), or other similar types of voice communications may be used as a training data set.

The method 300 continues with receiving a target conversation within which is a target voice communication signal (operation 316). As described above, a conversation analyzed according to the method 300 may benefit from pre-processing of various types. In one example, a target voice communication signal corresponding to the communication initiator (i.e., the caller initiating the call) may be separated from other signals within the communication. Other signals within the communication may include background noise and the voice signal associated with a recipient of the voice communication, whether a human voice or a machine generated voice (e.g., an IVR).

As described above, sounds within the voice communication not associated with the voice communication signal of interest (i.e., that of the caller) may be filtered or otherwise removed. In some examples, background sounds that are below a threshold amplitude (e.g., colloquially referred to as "volume") may be separated from the voice communication signal by filtering or other suppression techniques. In other examples, a machine generated voice from an IVR system receiving the call may be filtered using a corresponding voice profile associated with the IVR system. Similarly, a voice profile associated with the human agent that receives the call may be applied to the voice communication to filter out the voice of the receiving agent from the voice communication signal to be analyzed. In some examples, an audio stream corresponding to the recipient of the call (whether an IVR or a human agent) may be separated from an audio stream corresponding to the caller (i.e., the voice communication signal to be analyzed by the method 300).

Once trained, the trained machine learning model(s) may be applied to a target voice communication so that the target communication may be classified as genuine or not genuine (operation 320). More specifically, as described above, various attributes of the voice communication signal are identified by one or more trained machine learning models. In some examples, the system identifies a number (e.g., 1, 5, 10, etc.) of different frequencies that constitute the received voice communication signal (operation 328). In some examples, the system identifies the frequencies themselves (or ranges of frequencies) that constitute the received voice communication signal (operation 332). As described above, in some examples the system may use a convolutional neural network to perform the operations 328 and 332.

In some examples, the system may identify relative amplitudes of constituent frequencies in a voice communication signal (operation 336) and/or variations in amplitude of one or more of the constituent frequencies in a voice communication signal (operation 340). The operation 340 may also be referred to as analyzing the "power modulation" of the received voice communication signal. These latter two attributes, which are associated with patterns and/or changes in patterns within the voice communication signal, may, as described above, be identified using a recurrent neural network in some embodiments.

A trained machine learning model may then use the attributes identified in operation 320 to determine whether the target conversation is genuine (operation 348). If the target conversation is genuine, then the system may identify the target conversation as such (operation 352). Once identified as genuine, the system may route the call to a proper recipient, engage a CRM application, or take other action. In some embodiments, the system may turn to another incoming voice communication to analyze using the techniques described above.

If the target conversation is identified as not genuine (operation 356), the system may optionally terminate the call or re-direct the call to an appropriate remedial authority.

In some examples, a machine learning model may be trained to optionally identify an intent associated with a voice signal that is identified as not genuine in the operation 356. That is, the above training techniques may include a separate label associated a perceived intent of a call in addition to the label indicating whether a call is genuine or not genuine. This essentially trains a machine learning model as a multi-class classifier. Example intents may include a threat (e.g., inflicting harm), a prank, a time wasting distraction, confusion, or the like. In some examples, a severity level label may also be applied to the training so that a severity level of an intent may also be identified.

By applying a multi-class classifier to a call identified as not genuine and identifying an intent associated with the non-genuine voice communication, the system may also be trained to disposition the call in response to the identified intent. For example, the system may simply terminate calls that are not genuine and that are associated with a benign intent (e.g., a prank, a joke, or otherwise not directly harmful). Calls that are associated with a malicious or harmful intent or that may be harmful (e.g., a threat, a time consuming call to an emergency service) may be directed to authorities (e.g., law enforcement, other disciplinary agency) for remedial action. In some cases, a source of a malicious call may even be automatically traced by the system so that the perpetrator may be identified.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
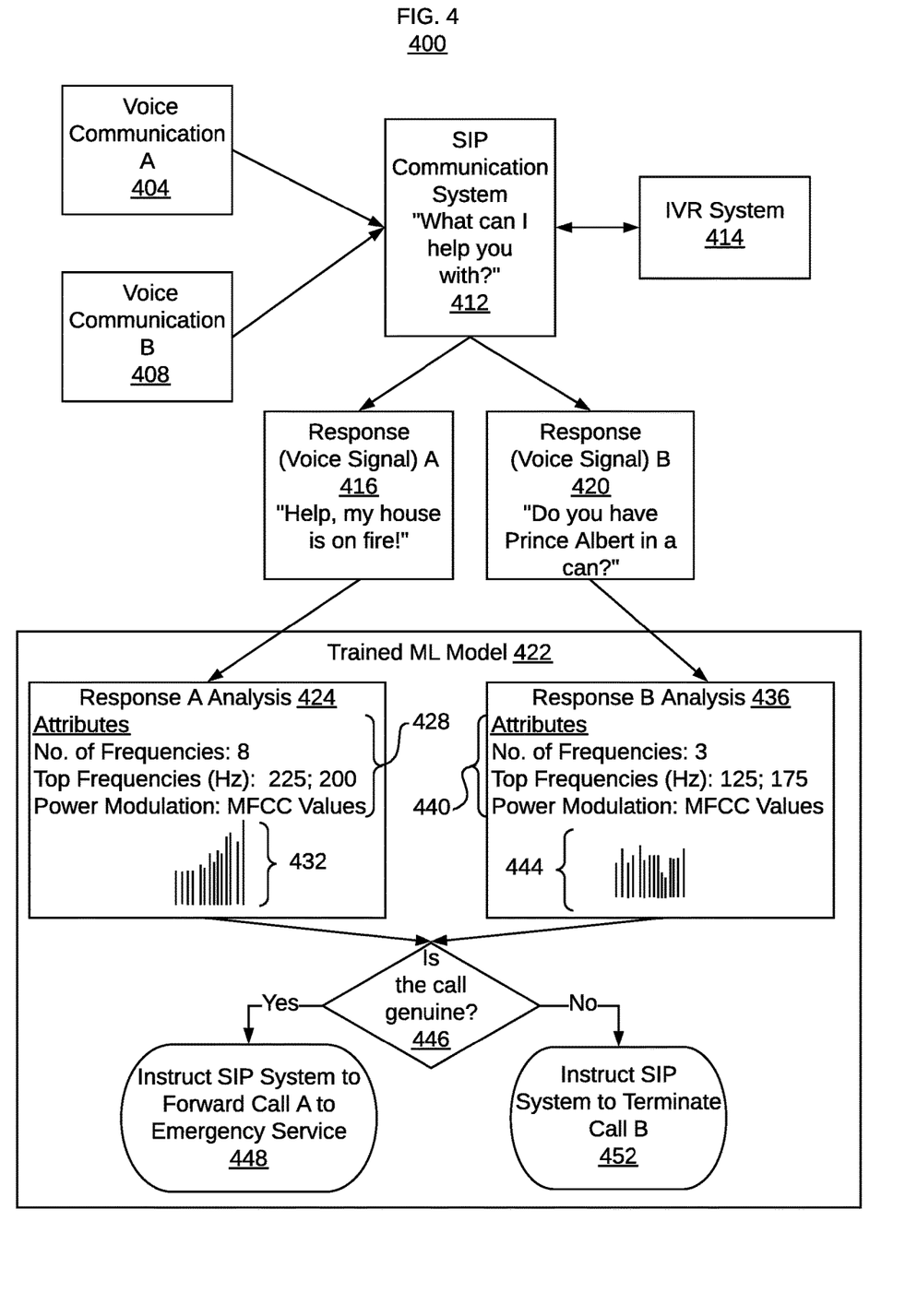
FIG. 4 illustrates an example embodiment of a system determining whether a voice communication is genuine or not genuine in accordance with one or more embodiments.

FIG. 4 schematically illustrates an example scenario 400 by which a trained machine learning model analyzes incoming voice communications to determine whether the communications are genuine or not genuine.

As shown, voice communication A 404 and voice communication B 408 are received by a SIP communication system 412. An IVR system 414, in communication with the SIP communication system 412, requests a voice input signal from each of the voice communication A 404 and voice communication B 408, asking "What can I help you with?". As described above, the IVR system 414 requests the voice input from each of the voice communications 404, 408 so that a voice signal may be analyzed to determine whether the voice communications 404, 408 are genuine or not genuine.

The system receives responsive voice signal 416 for voice communication A and voice signal 420 for voice communication B. Voice signal A 416 is "Help, my house is on fire!" and voice signal B 420 is "Do you have Prince Albert in a can?" These voice signals are then transmitted by the IP communication system 412 to a trained ML model 422.

The trained ML model 422 then generates an analysis 424 of the response A 416 and an analysis of the response B 436. Turning first to the schematic analysis 424 of response A, the system identifies attributes 428 associated with the responsive voice signal A 416. The attributes 428 of a number of frequencies in the responsive voice signal A 416 (8), the top (or most dominant) frequencies (225 Hz, 200 Hz), and power modulation values embodied as MFCC values. A power spectrum 432 of the responsive voice signal A 416 is also generated for purposes of illustration. The trained ML model 422 may generate an analogous analysis 436 of the response B 420 in which similar attributes 440 and a power spectrum 444 are generated.

The trained ML model 422 determines, based on analyses 424, 436 that voice communication A is genuine and that voice communication B is not genuine (operation 446). The trained ML model 422 may then instruct the SIP communication system 412 to forward genuine call A to an emergency service (operation 448) and terminate call B (operation 452).

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
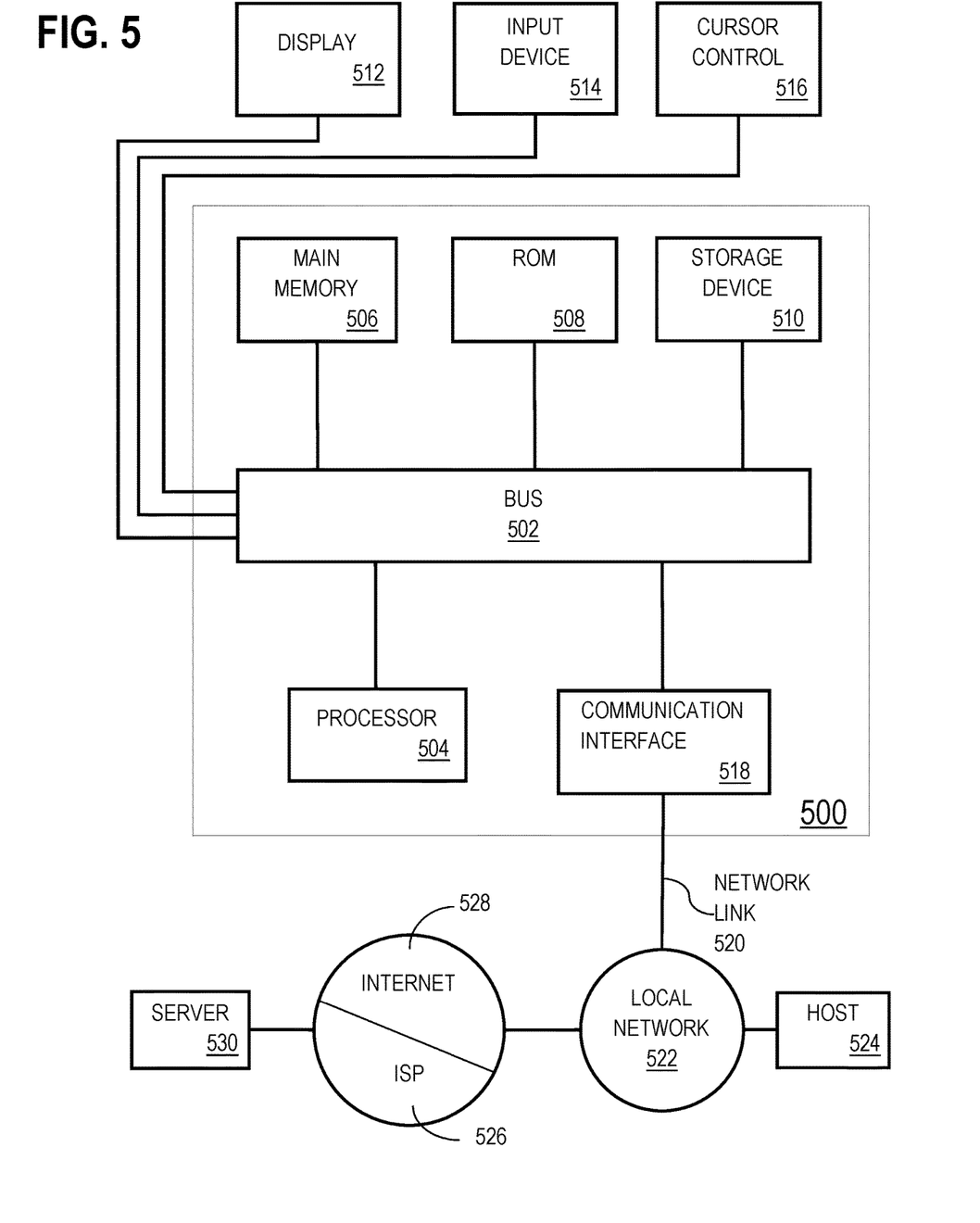
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    training a machine learning model to determine whether a received voice communication is genuine at least by:
        obtaining training data sets comprising historical data, each training data set comprising
            (a) vocal attributes of one or more received voice communications and (b) a respective label indicating whether the one or more received voice communications was genuine;
        training the machine learning model based on the training data sets;
    receiving a first target conversation comprising a first received voice communication signal;
    applying a first neural network to the first received voice communication signal, to identify a first set of vocal attributes of the first target conversation;
    applying a second neural network to the first set of vocal attributes of the first target conversation, to identify rates of changes of the first set of vocal attributes of the first target conversation;
    applying the trained machine learning model to (a) the first set of vocal attributes of the first target conversation and (b) the rates of changes of the first set of vocal attributes of the first target conversation, to classify the first target conversation as genuine;
    receiving a second target conversation comprising a second received voice communication signal; and
    applying the trained machine learning model to the second target conversation to classify the second target conversation as not genuine based on a second set of vocal attributes corresponding to the second received voice communication signal.

2. The media of claim 1, further comprising:
    applying the trained machine learning model to the first target conversation comprises applying the trained machine learning model to the first set of vocal attributes corresponding to the first target conversation.

3. The media of claim 1, wherein the first set of vocal attributes of the first target conversation and the vocal attributes of the voice communications in the training data sets comprise (1) a first number of different frequencies and (2) a second number of different frequencies, respectively.

4. The media of claim 1, wherein the first set of vocal attributes of the first target conversation and the vocal attributes of the voice communications in the training data sets comprise (1) a first set of frequencies and (2) a second set of frequencies, respectively.

5. The media of claim 4, wherein the first set of vocal attributes of the first target conversation and the vocal attributes of the voice communications in the training data sets comprise, respectively, (1) a first set of amplitudes, wherein amplitudes of the first set correspond to the frequencies of the first set of frequencies (2) a second set of amplitudes, wherein amplitudes of the second set correspond to the frequencies of the second set of frequencies.

6. The media of claim 4, wherein the first set of vocal attributes of the first target conversation and the vocal attributes of the one or more voice communications in the training data sets comprise, respectively, (1) a first set of amplitude variation rates for a first set of frequency ranges detected in the first target conversation and (2) a second set of amplitude variation rates for frequencies detected in the voice communications in the training data sets.

7. The media of claim 1, further comprising, responsive to determining that the first target conversation is genuine, identifying an intent of the first target conversation.

8. The media of claim 1, wherein (a) the respective label comprised by a first training data set in the training date sets indicates a genuine voice communication, and (b) the respective label comprised by a second training data set in the training data sets indicates a non-genuine voice communication.

9. The media of claim 1, wherein applying the trained machine learning model to (a) the first set of vocal attributes of the first target conversation and (b) the rates of changes of the first set of vocal attributes of the first target conversation comprises:
    generating a first feature vector of the first set of vocal attributes of the first target conversation;
    generating a second feature vector of the rates of changes of the first set of vocal attributes of the first target conversation;
    concatenating the first feature vector and the second feature vector, to obtain a concatenated feature vector;
    applying the trained machine learning model to the concatenated feature vector.

10. A method comprising:
    training a machine learning model to determine whether a received voice communication is genuine at least by:
        obtaining training data sets comprising historical data, each training data set comprising
            (a) vocal attributes of one or more received voice communications and (b) a respective label indicating whether the one or more received voice communications was genuine;
        training the machine learning model based on the training data sets;
    receiving a first target conversation comprising a first received voice communication signal;
    applying a first neural network to the first received voice communication signal, to identify a first set of vocal attributes of the first target conversation;
    applying a second neural network to the first set of vocal attributes of the first target conversation, to identify rates of changes of the first set of vocal attributes of the first target conversation;
    applying the trained machine learning model to (a) the first set of vocal attributes of the first target conversation and (b) the rates of changes of the first set of vocal attributes of the first target conversation, to classify the first target conversation as genuine;

receiving a second target conversation comprising a second received voice communication signal; and applying the trained machine learning model to the second target conversation to classify the second target conversation as not genuine based on a second set of vocal attributes corresponding to the second received voice communication signal.

11. The method of claim 10, further comprising:

applying the trained machine learning model to the first target conversation comprises applying the trained machine learning model to the first set of vocal attributes corresponding to the first target conversation.

12. The method of claim 10, wherein the first set of vocal attributes of the first target conversation and the vocal attributes of the voice communications in the training data sets comprise (1) a first number of different frequencies and (2) a second number of different frequencies, respectively.

13. The method of claim 10, wherein the first set of vocal attributes of the first target conversation and the vocal attributes of the voice communications in the training data sets comprise (1) a first set of frequencies and (2) a second set of frequencies, respectively.

14. The method of claim 13, wherein the first set of vocal attributes of the first target conversation and the vocal attributes of the voice communications in the training data sets comprise, respectively, (1) a first set of amplitudes, wherein amplitudes of the first set correspond to the frequencies of the first set of frequencies (2) a second set of amplitudes, wherein amplitudes of the second set correspond to the frequencies of the second set of frequencies.

15. The method of claim 13, wherein the first set of vocal attributes of the first target conversation and the vocal attributes of the one or more voice communications in the training data sets comprise, respectively, (1) a first set of amplitude variation rates for a first set of frequency ranges detected in the first target conversation and (2) a second set of amplitude variation rates for frequencies detected in the voice communications in the training data sets.

16. A system comprising:

at least one device including a hardware processor;

the system being configured to perform operations comprising:

training a machine learning model to determine whether a received voice communication is genuine at least by:
obtaining training data sets comprising historical data, each training data set comprising
(a) vocal attributes of one or more received voice communications and (b) a respective label indicating whether the one or more received voice communications was genuine;

training the machine learning model based on the training data sets;

receiving a first target conversation comprising a first received voice communication signal;

applying a first neural network to the first received voice communication signal, to identify a first set of vocal attributes of the first target conversation;

applying a second neural network to the first set of vocal attributes of the first target conversation, to identify rates of changes of the first set of vocal attributes of the first target conversation;

applying the trained machine learning model to (a) the first set of vocal attributes of the first target conversation and (b) the rates of changes of the first set of vocal attributes of the first target conversation, to classify the first target conversation as genuine;

receiving a second target conversation comprising a second received voice communication signal; and applying the trained machine learning model to the second target conversation to classify the second target conversation as not genuine based on a second set of vocal attributes corresponding to the second received voice communication signal.

17. The system of claim 16, further comprising:

applying the trained machine learning model to the first target conversation comprises applying the trained machine learning model to the first set of vocal attributes corresponding to the first target conversation.

18. The system of claim 16, wherein the first set of vocal attributes of the first target conversation and the vocal attributes of the voice communications in the training data sets comprise (1) a first number of different frequencies and (2) a second number of different frequencies, respectively.

* * * * *